(12) United States Patent
Nge et al.

(10) Patent No.: US 10,712,801 B2
(45) Date of Patent: Jul. 14, 2020

(54) USB TYPE-C POWER DELIVERY MANAGEMENT

(71) Applicant: Intel Corporation, Santa Clara, CA (US)

(72) Inventors: Chee Lim Nge, Hillsboro, OR (US); Eugene Gorbatov, Portland, OR (US); Zhongsheng Wang, Portland, OR (US); James G. Hermerding, II, Vancouver, WA (US); Basavaraj B. Astekar, Hillsboro, OR (US); Jenn Chuan Cheng, Penang (MY); Chia-Hung Sophia Kuo, Folsom, CA (US); Ashwin Umpathy, Hillsboro, OR (US); Tin-Cheung Kung, Folsom, CA (US); Yifan Li, Hillsboro, OR (US); Alexander B. Uan-Zo-Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 15/639,447

(22) Filed: Jun. 30, 2017

(65) Prior Publication Data

US 2019/0004584 A1    Jan. 3, 2019

(51) Int. Cl.
| | |
|---|---|
| *G06F 1/324* | (2019.01) |
| *G06F 1/3287* | (2019.01) |
| *G06F 13/38* | (2006.01) |
| *G06F 13/42* | (2006.01) |
| *G06F 1/26* | (2006.01) |
| *G06F 1/3296* | (2019.01) |

(Continued)

(52) U.S. Cl.
CPC .............. *G06F 1/324* (2013.01); *G06F 1/266* (2013.01); *G06F 1/3287* (2013.01); *G06F 13/385* (2013.01); *G06F 13/4282* (2013.01); *G06F 1/3215* (2013.01); *G06F 1/3296* (2013.01); *G06F 13/4081* (2013.01)

(58) Field of Classification Search
CPC .... G06F 1/266; G06F 13/4081; G06F 1/3215; G06F 1/324; G06F 1/3287; G06F 13/385; G06F 13/4282
USPC ...................................... 713/300, 322; 710/8
See application file for complete search history.

(56) References Cited

U.S. PATENT DOCUMENTS

| | | |
|---|---|---|
| 8,275,914 B2 | 9/2012 | Kim et al. |
| 2002/0162036 A1* | 10/2002 | Kim ........................ G06F 1/266 713/300 |

(Continued)

OTHER PUBLICATIONS

PCT International Search Report and Written Opinion issued in PCT/US2018/036841 dated Sep. 28, 2018; 13 pages.

*Primary Examiner* — Ji H Bae
(74) *Attorney, Agent, or Firm* — Patent Capital Group

(57) ABSTRACT

When power is provided through a USB-C cable from a source device to a sink device, a sudden connection or disconnection of the cable between the two devices may cause a sudden power surge or power drop in at least one of those devices, leading to other problems. To avoid this sudden event from causing potential damage or disruption to one of the devices, in some embodiments a CC pin in the cable is used to announce the impending connection/disconnection, and the device may throttle back its power consumption before power is actually applied to or removed from the power pins.

7 Claims, 4 Drawing Sheets

(51) Int. Cl.
    *G06F 1/3215*    (2019.01)
    *G06F 13/40*     (2006.01)

(56) References Cited

U.S. PATENT DOCUMENTS

| | | | |
|---|---|---|---|
| 2007/0022311 A1* | 1/2007 | Park | G06F 1/266 |
| | | | 713/310 |
| 2009/0077400 A1* | 3/2009 | Enami | G06F 1/266 |
| | | | 713/320 |
| 2015/0248151 A1 | 9/2015 | Lim | |
| 2016/0254902 A1 | 9/2016 | Nagase | |
| 2017/0031403 A1 | 2/2017 | Waters | |
| 2017/0139467 A1 | 5/2017 | Waters et al. | |
| 2018/0314309 A1* | 11/2018 | Lyu | G06F 1/266 |

* cited by examiner

USB Type-C Receptacle Interface (Front View)

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | V$_{BUS}$ | CC1 | D+ | D− | SBU1 | V$_{BUS}$ | RX2− | RX2+ | GND |
| GND | RX1+ | RX1− | V$_{BUS}$ | SBU2 | D− | D+ | CC2 | V$_{BUS}$ | TX2− | TX2+ | GND |
| B12 | B11 | B10 | B9 | B8 | B7 | B6 | B5 | B4 | B3 | B2 | B1 |

FIG. 1
(PRIOR ART)

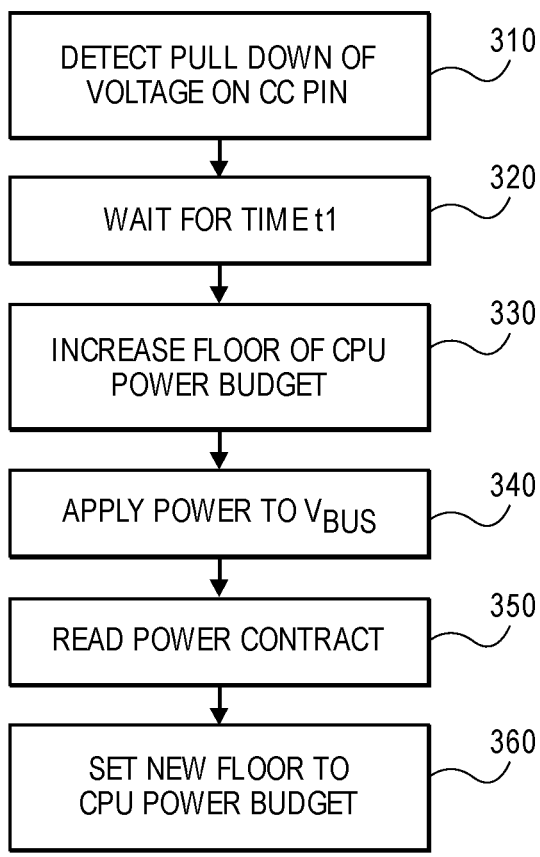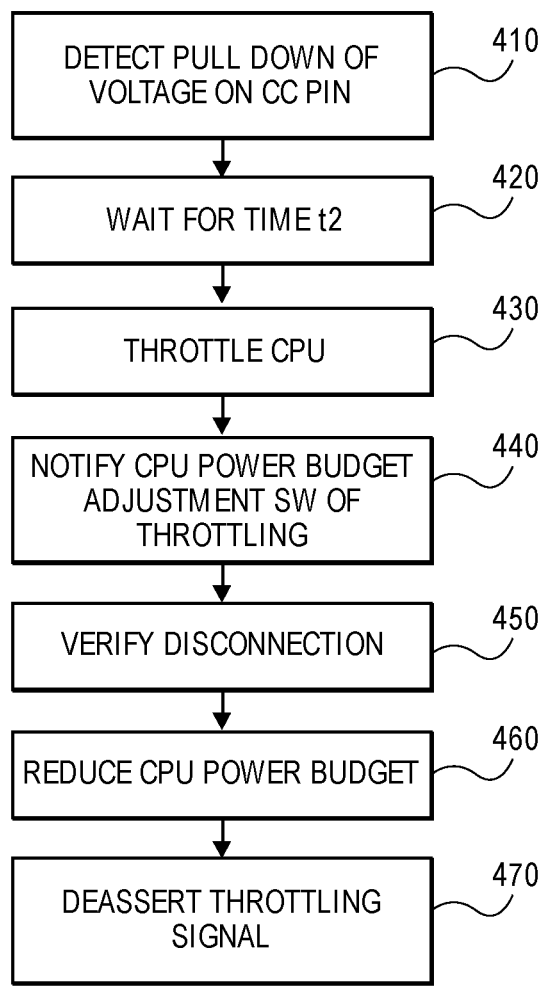
FIG. 3
FIG. 4

USB TYPE-C POWER DELIVERY MANAGEMENT

TECHNICAL FIELD OF THE INVENTION

Embodiments of the invention relate generally to using USB-C (Universal Serial Bus type C) interconnects. In particular, embodiments relate to managing the delivery of power from one device to another through the USB-C cable when that cable is connected or disconnected.

BACKGROUND

USB-C is an industry standard still in development at the time of this writing. Among other improvements over previous versions of USC standards, it contains more pins (24), has identical connectors at each end so that either end may be plugged into either device, and each connector is reversible (it may be rotated 180 degrees before insertion and will still work properly). Another improvement is that it permits greatly increased power to be transferred through the USB-C cable. However, this increased power flow may create problems if the cable is suddenly connected or disconnected, due to the sudden change in power consumption (surge or drop) by at least one of the connected devices.

In particular, when one of the devices is a mobile PC or other device with a CPU, and with substantial power being transferred through the USB-C cable, the following challenges may be present, neither of which is corrected or compensated for by current approaches:

1) When the mobile PC operates as a USB-C sink (consumes power received from the cable) the power budget allocated to the CPU may need to be reduced immediately before the USB-C port is dis-connected. This would avoid the CPU drawing excessive power from its own battery after the disconnection, resulting in a possible system crash.

2) When the mobile PC operates as a USB-C source (delivers power through the cable), the power budget allocated to the CPU may need to be reduced immediately before power is provided through the USB-C cable. This would avoid overstressing the battery or the power supply due to the suddenly higher power consumption created by the device at the other end of the USB-C cable.

BRIEF DESCRIPTION OF THE DRAWINGS

Some embodiments of the invention may be better understood by referring to the following description and accompanying drawings that are used to illustrate embodiments of the invention. In the drawings:

FIG. 1 shows pin assignments for a typical USB-C cable.

FIG. 3 shows a flow diagram of a method performed by a Source device when making a USB-C connection, according to an embodiment of the invention.

FIG. 4 shows a flow diagram of a method performed by a Sink device when making a USB-C disconnection, according to an embodiment of the invention.

DETAILED DESCRIPTION

Figure 2:
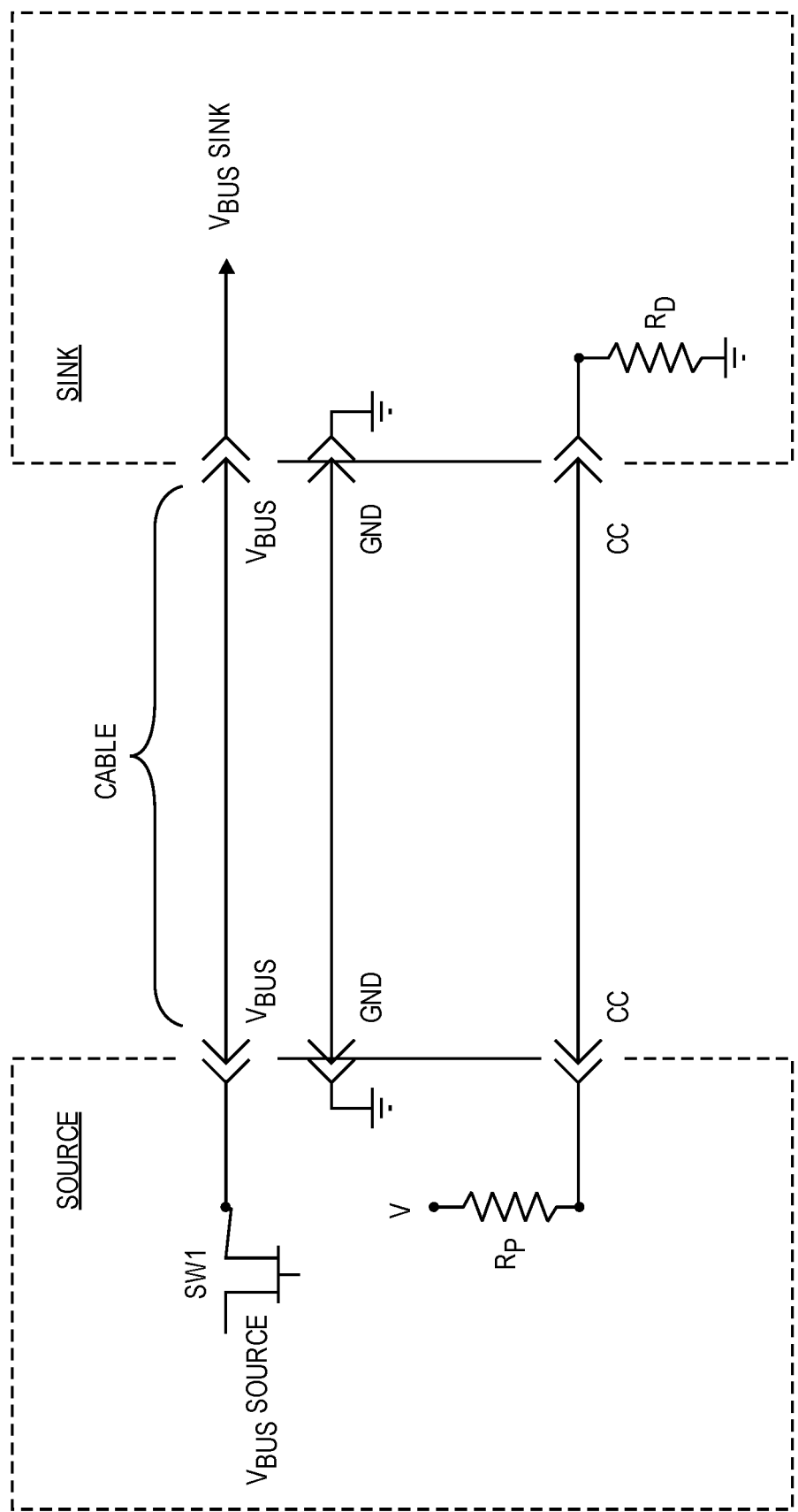
FIG. 2 shows a diagram of two devices connected by a USB-C cable, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented fully or partially in software and/or firmware. This software and/or firmware may take the form of instructions (e.g., instructions 124) contained in or on a non-transitory computer-readable storage medium (e.g., medium 222, main memory 204, and/or static memory 206). The medium may also be external to a device such as device 100, with the intention that the instructions will eventually be loaded into, and executed by, a device such as device 100. The instructions may be read and executed by the one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

As used in this document, it should be noted that the terms 'plugged in' and 'unplugged' imply a stead state relationship between two mating connectors—they are either mated together or are not mated, but are not in a transition between the two states.

Also as used in this document, it should be noted that the terms 'connect' and 'disconnect', and their derivatives, imply an action in which two mating connectors are making a transition to/from a plugged in state and an unplugged state. These terms also imply that the opposite end of the cable is already plugged in to the device at that opposite end. If the device at the opposite end of the cable is not already plugged in, the indicated operations for the described end may not take place.

FIG. 1 shows pin assignments for a typical USB-C cable. To understand the various embodiments of the invention to follow, this prior art explanation of USB-C pin assignments is shown. The connector shown is made to interface with a board-edge connector with 12 pins on either side, shown as the A side and the B side. This drawing is labeled as a receptacle, with the board-edge plug fitting in between the upper (A) pins and the lower (B) pins. As can be seen, the pin assignments are such that rotating the connector by 180 degrees produces the same pin functionality in the same locations. Power delivery is handled by the Vbus pins (voltage) and the GND pins (power ground). Regardless of connector orientation, four Vbus pins and four GND pins will be connected when the cable is plugged in, to increase the potential current capacity. Although not shown in this diagram, the Vbus pins and GND pins are longer than the rest, so that the power pins will make contact first when the cable is connected, and will lose contact last when the cable is disconntected.

FIG. 2 shows a diagram of two devices connected by a USB-C cable, according to an embodiment of the invention. The device intended to deliver power is labeled the source device, while the device intended to receive that power is labeled the sink device. Only three functional connections are shown, as these are the functions that may be used to control power delivery when the cable is connected or disconnected. Other pins used for communication between the devices are not shown, as they are considered unnecessary for the operation of various embodiments of the power delivery functions described herein.

As mentioned before, the Vbus and GND pins may be connected first and disconnected last due to their extra length, leaving all other pins briefly in a non-functional state until all pins are in a plugged-in or unplugged state. However, this may not necessarily mean that power is actually delivered by the source device during that brief time, or that the final load is placed on the power pins by the sink device during that brief time. Switch SW1 may be used to control whether and when power is actually applied by the source device to the Vbus pin. As may be seen in subsequent paragraphs, the channel control (CC) pin may be used to signal a potential connection or disconnection of the cable, which may subsequently be verified. During the brief state of potential non-functionality, the devices may use the CC pin to determine if a connection or disconnection is actually taking place, and perform suitable adjustments to avoid potential surges in power caused by that action.

Looking at the illustrated embodiment of FIG. 2, it can be seen that pin CC in the source device may be pulled up to voltage V when the cable is unplugged at either end, since there is no current flow through resistor Rp. It should be noted that this voltage V may or may not be the same voltage that is conveyed over the Vbus pin. Similarly, pin CC in the sink device may be pulled down to ground when the cable is unplugged at either end, since there is no current flow through resistor Rd. But when the cable is plugged in at both ends, pin CC in both of the devices may stabilize at V*Rp/(Rp+Rd). It should be noted that other resistors, and even capacitors and/or inductors, may be included at either or both ends to change the specific dynamics, but the overall explanation should be the same as in this simplified arrangement.

When the cable is first connected, the voltage at pin CC in the source device may drop (from V to V*Rd/(Rp+Rd) in this case). This drop in voltage may be the signal to the source device that the cable is being connected and that the power pins are already connected. Similarly, when the cable is first connected, the voltage at pin CC in the sink device may rise (from Gnd to V*Rd/(Rp+Rd)). This rise in voltage may be the signal to the sink device that a connection of the cable is taking place, and that the power pins are already connected.

Similarly, when pin CC of the cable is disconnected, the voltage at pin CC in the source device may rise from V*Rd/(Rp+Rd) to V, while the voltage at pin CC in the sink device may drop from V*Rd/(Rp+Rd) down to Gnd. This rise in voltage at CC of the source device and drop in voltage at pin CC of the sink device may be a signal to both devices that a disconnection of the cable is taking place. However, since the power pins are longer than the CC pin, they may remain connected for a short time after the voltage transition at CC pin. Upon receiving this indication that a connection or disconnection is immenent, each device may take suitable precautions to avoid any power surges or other disruptions that might take place due to a sudden change in the power load.

As can be seen from this discussion, a rise or fall in the voltage on the CC pin may be used to indicate a connection state transition, as a means to show potential power connection or disconnection, even though the actual power attachment between two USB-C ports is based on the Vbus connection. This potential connection or disconnection may then be used to trigger a crude reduction of the CPU power budget. This crude reduction may then be followed by a more accurate adjustment to the CPU power budget after the connection or disconnection has been completed.

In some embodiments, this more accurate adjustment may be based on a power contract (agreement) established by the two devices through the signal connections over the USB-C cable.

In the following descriptions, the concepts of 'power budget' and 'power floor' are used. These may be used in the following manner:

Floor Power: $P_{floor}$=the combination of leakage power and the power of all other components not directly proportional to the clock frequency.

CPU Power: $P_{CPU}=\frac{1}{2}CV^2 fA+P_{floor}$ where C is the dynamic capacitance, V is the operating voltage, f is the clock frequency, and A is the activity factor.

USB Floor Power: $P_{floor-USB}$=an artificially-derived adjustment to $P_{floor}$ that makes allowance for the additional power load that may be demanded by (or power supply that may be provided by) the device at the other end of the USB-C cable, as negotiated with that other device.

FIG. 3 shows a flow diagram of a method performed by a source device when making a USB-C connection, according to an embodiment of the invention. This flow assumes a device with a CPU (such as but not limited to a mobile computer device) is the device performing the method and is a source device for power delivery through the USB-C cable.

In flow diagram 300, at 310 the source device may detect a pull down of the voltage on the CC pin of that source device. Using the components of FIG. 2, this may be a pull down from voltage V to voltage V*Rd/(Rp+Rd), but other values may also be used. At 320, the device may wait for a time t1 to allow for contact bounce or other temporary conditions. In some embodiments, this time may also be used to determine if the device at the opposite end of the cable intends to become a sink. Time t1 may have various values, but in one embodiment may be 100 milliseconds (msec). After the time delay of t1, at 330 the floor of the CPU power budget may be increased by $P_{floor-USB}$. In some embodiments, this may be the nameplate advertised power level of the USB-C port. At this point, power may be applied at 340 to the Vbus pin, thus providing power to the Sink device. Referencing FIG. 2, this power may be applied through switch SW1.

Once the cable has been fully plugged in so that the two devices can communicate, at 350 the source device may negotiate the power contract with the sink device to determine a new CPU power budget. The source device may then set the CPU power budget at 360, based on this contract.

FIG. 4 shows a flow diagram of a method performed by a sink device when making a USB-C disconnection, according to an embodiment of the invention. This flow assumes a device with a CPU (such as but not limited to a mobile computer device) is the device performing the method and is a sink device for power received through the USB-C cable.

In flow diagram 400, at 410 the sink device may detect a pull down of the voltage on the CC pin of that sink device. Using the components of FIG. 2, this may be a pull down from voltage V*Rd/(Rp+Rd) to ground, but other values may also be used.

At 420 the device may wait for a time t2 to assure pin CC remains at ground, thus assuring a disconnection is taking place. Time t2 may have various values, but in one embodiment may be approximately 100 micro-second (usec). After this time, the CPU may be throttled back at 430 by reducing the operating voltage and/or clock frequency of the CPU. At 440, the CPU power budget software may be notified that the power budget is being throttled due to a potential disconnect. Operations 430 and 440 may be performed in either order or simultaneously.

At 450 the disconnection may be verified. This may be done in various ways, such as but not limited to determining a loss of voltage on Vbus. The CPU power budget may be reduced at 460, followed by cancelling the throttling action of 430.

Figure 5:
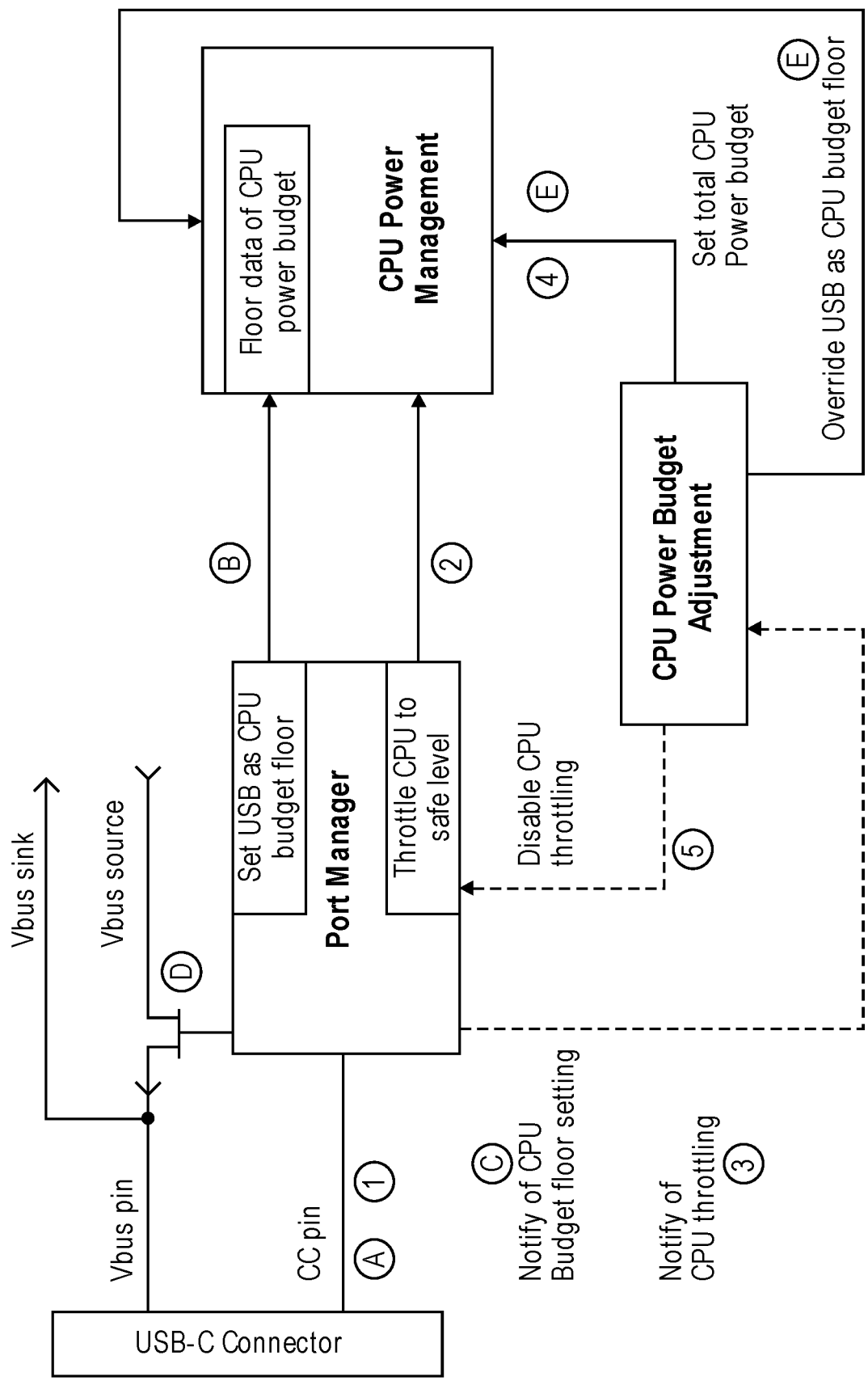
FIG. 5 shows a block diagram of module in a device using a USB-C power system, according to an embodiment of the invention.

FIG. 5 shows a block diagram of module in a device using a USB-C power system, according to an embodiment of the invention. The embodiment of FIG. 5 shows three main modules, labeled Port Manager, CPU Power Management, and the CPU Power Budget Adjustment, although other labels may be used. Each module may contain any combination of hardware, software, or firmware. The same modules may be used as shown for a source port connect or a sink port disconnect.

Referring to FIG. 5 and the indicated labels A-E, a potential connection at the source port may be described by:

A) The Port Manager may detect a pull down on the CC pin (by the far-end sink device) and wait for 100 msec to verify the far-end device intends to become a sink.

B) After 100 msec, the Port Manager may increase the floor of the CPU power budget by writing a value to $P_{floor-USB}$. In some embodiments, this may be the nameplate advertised power level of the port.

C) The Port Manager may notify the CPU Power Budget Adjustment module that it has written to $P_{floor-USB}$.

D) The Port Manager may turn on a MOSFET switch to supply voltage on the Vbus port. The step may come before, after, or at the same time as step C).

E) The CPU Power Budget Adjustment module may read the actual power contract of the port and then may set a new value to $P_{floor-USB}$ based on that contract.

Again referring to FIG. 5 and the indicated labels 1-5, a potential disconnection at the sink port may be described by:

1) The Port Manager may detect that the CC pin is pulled low longer than 100 usec. This would not be expected under normal conditions and would most likely indicate a disconnection is in progress.

2) The Port Manager may assert a signal to throttle the CPU to a safe level. In one embodiment the CPU may set the clock to the lowest frequency mode and then reduce the operating voltage.

3) The Port Manager may notify the CPU Power Budget Adjustment module that CPU throttling is occurring due to a potential disconnect.

4) The CPU Power Budget Adjustment module may verify that the sink port has indeed been disconnected. This may be verified in various ways, such as but not limited to detecting a loss of power at the Vbus pin.

5) The CPU Power Budget Adjustment module may notify the Port Manager to de-assert the signal of throttling the CPU power.

The device may also contain a CPU coupled to the CPU power management module, and a battery coupled to the CPU. Neither are shown in FIG. 5 due to space constraints in the drawing.

EXAMPLES

The following examples pertain to particular embodiments:

Example 1 includes a device having a USB-C port, a port manager module, and a CPU power budget adjustment module, the device to: detect a voltage pull-down on a CC pin of the USB-C port; after a time delay, increase a floor of a CPU power budget; notify a CPU Power Budget adjustment module of said increasing the floor of the CPU power budget; apply power to a Vbus pin of the USB-C port; read a power contract negotiated with a second device connected to a USB-C cable connected to the USB-C port; and set a new floor to the CPU power budget based on the power contract.

Example 2 includes the device of example 1, wherein the CPU floor power comprises a combination of leakage power and power consumed by other components not proportional to clock frequency.

Example 3 includes the device of example 1, wherein said notifying is to be performed by a CPU power budget adjustment module.

Example 4 includes the device of example 1, wherein said increasing the floor is to be performed by a port manager module.

Example 5 includes the device of example 1, further comprising a CPU power management module coupled to the CPU power budget adjustment module and the port manager module.

Example 6 includes the device of example 1, further comprising the CPU coupled to the CPU power management module.

Example 7 includes the device of example 6, further comprising a battery coupled to the CPU.

Example 8 includes the device of example 1, wherein the USB-C port comprises a 24-pin USB-C connector.

Example 9 includes a device having a USB-C port, a port manager module, and a CPU power budget adjustment module, the device to: detect a voltage pull up at a CC pin of a USB-C port; after a time delay, assert a signal to throttle a CPU to a lower power consumption level; provide notification of CPU throttling; verify sink port has been disconnected; and de-assert the signal to throttle the CPU power.

Example 10 includes the device of example 9, wherein said throttling the CPU comprises performing at least one item selected from a list of items consisting of: a) reducing an operating frequency of the CPU, and b) reducing an operating voltage of the CPU.

Example 11 includes the device of example 9, wherein said providing notification is provided to the power budget adjustment module.

Example 12 includes the device of example 9, further comprising a CPU power management module coupled to the CPU power budget adjustment module and the port manager module.

Example 13 includes the device of example 9, further comprising the CPU coupled to the CPU power management module.

Example 14 includes the device of example 12, further comprising a battery coupled to the CPU.

Example 15 includes a computer-readable non-transitory storage medium that contains instructions, which when executed by one or more processors result in performing operations comprising: detecting a voltage pull-down on a CC pin of the USB-C port; after a time delay, increasing a floor of a CPU power budget; notifying a CPU Power Budget Adjustment module of said increasing the floor of the CPU power budget; applying power to a Vbus pin of the USB-C port; reading a power contract negotiated with a second device connected to a USB-C cable connected to the USB-C port; and setting a new floor to the CPU power budget based on the power contract.

Example 16 includes the medium of example 15, wherein the CPU floor power comprises a combination of leakage power and power consumed by other components not proportional to clock frequency.

Example 17 includes the medium of example 15, wherein said notifying is to be performed by a CPU power budget adjustment module and said increasing the floor is to be performed by a port manager module.

Example 18 includes a computer-readable non-transitory storage medium that contains instructions, which when executed by one or more processors result in performing operations comprising: detecting a voltage pull up at a CC pin of a USB-C port; after a time delay, asserting a signal to throttle a CPU to a lower power consumption level; providing notification of said CPU throttling; verifying a sink port has been disconnected; and de-asserting the signal to throttle the CPU power.

Example 19 includes the medium of example 18, wherein the operation of throttling the CPU comprises performing at least one item selected from a list of items consisting of: a) reducing an operating frequency of the CPU, and b) reducing an operating voltage of the CPU.

Example 20 includes the medium of example 18, wherein the operation of providing notification comprises providing notification to a power budget adjustment module.

Example 21 includes a method of controlling power delivery through a USB-C cable port, comprising: detecting a voltage pull-down on a CC pin of the USB-C port; after a time delay, increasing a floor of a CPU power budget; notifying a CPU Power Budget Adjustment module of said increasing the floor of the CPU power budget; applying power to a Vbus pin of the USB-C port; reading a power contract negotiated with a second device connected to a USB-C cable connected to the USB-C port; and setting a new floor to the CPU power budget based on the power contract.

Example 22 includes the method of example 21, wherein the CPU floor power comprises a combination of leakage power and power consumed by other components not proportional to clock frequency.

Example 23 includes the method of example 21, wherein said notifying is to be performed by a CPU power budget adjustment module and said increasing the floor is to be performed by a port manager module.

Example 24 includes a method of controlling power reception through a USB-C cable port, comprising: detecting a voltage pull up at a CC pin of a USB-C port; after a time delay, asserting a signal to throttle a CPU to a lower power consumption level; providing notification of said CPU throttling; verifying a sink port has been disconnected; and de-asserting the signal to throttle the CPU power.

Example 25 includes the method of example 24, wherein said throttling the CPU comprises performing at least one item selected from a list of items consisting of: a) reducing an operating frequency of the CPU, and b) reducing an operating voltage of the CPU.

Example 26 includes the method of example 24, wherein said providing notification comprises providing notification to a power budget adjustment module.

Example 27 includes a device for controlling power delivery through a USB-C port, the device having means to: detect a voltage pull-down on a CC pin of the USB-C port; after a time delay, increase a floor of a CPU power budget; notify a CPU Power Budget adjustment module of said increasing the floor of the CPU power budget; apply power to a Vbus pin of the USB-C port; read a power contract negotiated with a second device connected to a USB-C cable connected to the USB-C port; and set a new floor to the CPU power budget based on the power contract.

Example 28 includes the device of example 27, wherein the CPU floor power comprises a combination of leakage power and power consumed by other components not proportional to clock frequency.

Example 29 includes the device of example 27, wherein said notifying is to be performed by a CPU power budget adjustment means and said increasing the floor is to be performed by a port manager means.

Example 30 includes the device of example 27, further comprising a CPU means.

Example 31 includes a device for controlling power delivery through a USB-C port, the device having means to: detect a voltage pull up at a CC pin of a USB-C port; after a time delay, assert a signal to throttle a CPU to a lower power consumption level; provide notification of CPU throttling; verify sink port has been disconnected; and de-assert the signal to throttle the CPU power.

Example 32 includes the device of example 31, wherein said means for throttling the CPU comprises means for performing at least one item selected from a list of items consisting of: a) reducing an operating frequency of the CPU, and b) reducing an operating voltage of the CPU.

Example 33 includes the device of example 31, wherein said means for providing notification comprises means for providing notification to a power budget adjustment module.

The foregoing description is intended to be illustrative and not limiting. Variations will occur to those of skill in the art. Those variations are intended to be included in the various embodiments of the invention, which are limited only by the scope of the following claims.

What is claimed is:

1. A device for managing power, wherein the device comprises:
   a CPU, a USB-C port, and a switch;
   wherein the CPU is programmed to detect a voltage pull-down on a CC pin of the USB-C port;
   wherein, after a time delay, the CPU is programmed to increase a floor of a CPU power budget;
   wherein the CPU is notified of said increasing the floor of the CPU power budget;

wherein the switch is to apply power to a Vbus pin of the USB-C port;

wherein the CPU is programmed to read a power contract negotiated with a second device connected to a USB-C cable connected to the USB-C port; and wherein the CPU is programmed to set a new floor to the CPU power budget based on the power contract.

2. The device of claim 1, wherein the CPU floor power comprises a combination of leakage power and power consumed by other components not proportional to clock frequency.

3. The device of claim 1, further comprising
a battery coupled to the CPU.

4. The device of claim 1, wherein the USB-C port comprises a 24-pin USB-C connector.

5. A computer-readable non-transitory storage medium that contains instructions which, when executed by one or more processors in a device including a USB-C port, result in performing operations comprising:

detecting a voltage pull-down on a CC pin of the USB-C port;

after a time delay, increasing a floor of a CPU power budget;

notifying a CPU Power Budget Adjustment module of said increasing the floor of the CPU power budget;

applying power to a Vbus pin of the USB-C port;

reading a power contract negotiated with a second device connected to a USB-C cable connected to the USB-C port; and setting a new floor to the CPU power budget based on the power contract.

6. The medium of claim 5, wherein the CPU floor power comprises a combination of leakage power and power consumed by other components not proportional to clock frequency.

7. The medium of claim 5, wherein said notifying is to be performed by hardware, and said increasing the floor is to be performed by software.

\* \* \* \* \*

UNITED STATES PATENT AND TRADEMARK OFFICE
CERTIFICATE OF CORRECTION

PATENT NO. : 10,712,801 B2  
APPLICATION NO. : 15/639447  
DATED : July 14, 2020  
INVENTOR(S) : Chee Lim Nge et al.

Page 1 of 1

It is certified that error appears in the above-identified patent and that said Letters Patent is hereby corrected as shown below:

On the Title Page

In Column 1, (72) Inventors, Line 9, delete "Umpathy" and insert -- Umapathy --, therefor.

Signed and Sealed this  
Twenty-fifth Day of August, 2020

Andrei Iancu  
*Director of the United States Patent and Trademark Office*